United States Patent
Ley et al.

(10) Patent No.: US 11,309,708 B2
(45) Date of Patent: Apr. 19, 2022

(54) UTILITY-SCALE RENEWABLE PEAKER PLANT, TIGHTLY COUPLED SOLAR PV AND ENERGY STORAGE

(71) Applicant: Fluence Energy, LLC, Arlington, VA (US)

(72) Inventors: Samuel Ley, Boulder, CO (US); Felipe Cantero, Arvada, CO (US)

(73) Assignee: Fluence Energy, LLC, Arlington, VA (US)

( * ) Notice: Subject to any disclaimer, the term of this patent is extended or adjusted under 35 U.S.C. 154(b) by 0 days.

(21) Appl. No.: 16/369,600

(22) Filed: Mar. 29, 2019

(65) Prior Publication Data

US 2019/0305551 A1    Oct. 3, 2019

Related U.S. Application Data

(60) Provisional application No. 62/650,614, filed on Mar. 30, 2018.

(51) Int. Cl.
| H02J 3/02 | (2006.01) |
| H02J 3/38 | (2006.01) |
| H02J 1/12 | (2006.01) |
| H02J 3/32 | (2006.01) |

(52) U.S. Cl.
CPC .............. H02J 1/12 (2013.01); H02J 3/02 (2013.01); H02J 3/32 (2013.01); H02J 3/385 (2013.01)

(58) Field of Classification Search
CPC ........ H02J 1/12; H02J 3/02; H02J 3/32; H02J 3/385
See application file for complete search history.

(56) References Cited

U.S. PATENT DOCUMENTS

| 6,134,124 A | 10/2000 | Jungreis et al. |
| 8,575,780 B2* | 11/2013 | Moon ............... H02J 9/062 307/66 |
| 8,854,004 B2 | 10/2014 | Lee |
| 9,989,949 B2* | 6/2018 | Debone ............... G05B 19/048 |
| 10,320,193 B2* | 6/2019 | Porter ............... H02J 3/382 |

(Continued)

FOREIGN PATENT DOCUMENTS

CA   3048106 A1   3/2011

OTHER PUBLICATIONS

International Search Report and Written Opinion dated Jun. 24, 2019, issued in corresponding International Patent Application No. PCT/US2019/024830.

(Continued)

*Primary Examiner* — Dinh T Le
(74) *Attorney, Agent, or Firm* — RatnerPrestia

(57) ABSTRACT

An exemplary power system includes a DC power bus and a photovoltaic system connected to the DC power bus. An energy storage system is connected to the DC power bus and stores energy injected to the DC power bus by the photovoltaic system. A power inverter is connected to the DC power bus and converts power between the DC power bus and an AC connected load. The power system also includes a control system that receives power system data from one or more sub-systems and devices connected to the DC power bus, and controls, in real-time, one or more of the power inverter and the energy storage system to act as a load on the DC power bus based on the received power system data.

46 Claims, 9 Drawing Sheets

(56) References Cited

U.S. PATENT DOCUMENTS

| | | | |
|---|---|---|---|
| 10,535,998 B2 * | 1/2020 | Epel | H02J 3/28 |
| 10,673,242 B2 * | 6/2020 | Nakayama | H02J 13/0006 |
| 10,875,406 B2 * | 12/2020 | Galin | H02J 3/382 |
| 2008/0238195 A1 | 10/2008 | Shaver et al. | |
| 2010/0001587 A1 | 1/2010 | Casey et al. | |
| 2011/0215649 A1 * | 9/2011 | Min | H02J 1/00 307/72 |
| 2012/0299386 A1 | 11/2012 | Kaufman et al. | |
| 2015/0112496 A1 | 4/2015 | Fisher et al. | |

OTHER PUBLICATIONS

Extended European Search Report dated Nov. 29, 2021, issued in corresponding European Patent Application No. 19775922.8.

Chilean Office Action with Search Report for Application No. 2020025227, dated Dec. 15, 2021, 11 pages.

* cited by examiner

| | Inverter Power (MW) | Battery Capacity (MWhs) | Max BSS Power (MW) | |
|---|---|---|---|---|
| | 60 | 240 | 100 | |
| Time | PV Power | Battery Power | Battery SOC | Peak Hours | Grid Power |
| 0:00 | 0 | 0 | 0% | 0 | 0 |
| 1:00 | 0 | 0 | 0.00% | 0 | 0 |
| 2:00 | 0 | 0 | 0.00% | 0 | 0 |
| 3:00 | 0 | 0 | 0.00% | 0 | 0 |
| 4:00 | 0 | 0 | 0.00% | 0 | 0 |
| 5:00 | 0 | 0 | 0.00% | 0 | 0 |
| 6:00 | 0 | 0 | 0.00% | 0 | 0 |
| 7:00 | 5 | 0 | 0.00% | 0 | 5 |
| 8:00 | 12 | 0 | 0.00% | 0 | 12 |
| 9:00 | 25 | 0 | 0.00% | 0 | 25 |
| 10:00 | 45 | 0 | 0.00% | 0 | 45 |
| 11:00 | 84 | -24 | 10.00% | 0 | 60 |
| 12:00 | 100 | -40 | 26.67% | 0 | 60 |
| 13:00 | 84 | -24 | 36.67% | 0 | 60 |
| 14:00 | 45 | 0 | 36.67% | 0 | 45 |
| 15:00 | 25 | 15 | 30.42% | 40 | 40 |
| 16:00 | 12 | 28 | 18.75% | 40 | 40 |
| 17:00 | 5 | 35 | 4.17% | 40 | 40 |
| 18:00 | 0 | 40 | 0.00% | 40 | 40 |
| 19:00 | 0 | 0 | 0.00% | 0 | 0 |
| 20:00 | 0 | 0 | 0.00% | 0 | 0 |
| 21:00 | 0 | 0 | 0.00% | 0 | 0 |
| 22:00 | 0 | 0 | 0.00% | 0 | 0 |
| 23:00 | 0 | 0 | 0.00% | 0 | 0 |

Fig. 6B

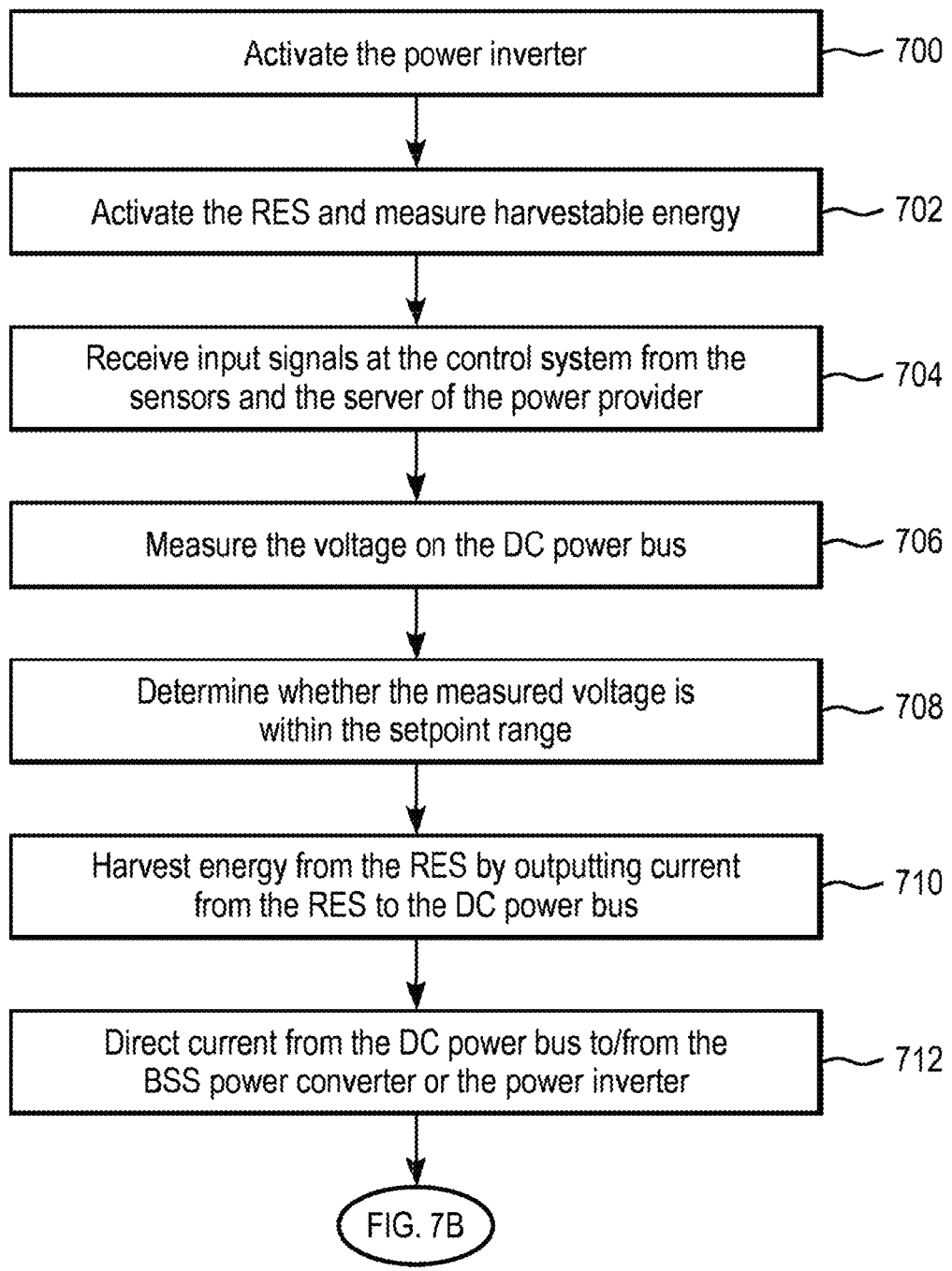

UTILITY-SCALE RENEWABLE PEAKER PLANT, TIGHTLY COUPLED SOLAR PV AND ENERGY STORAGE

RELATED APPLICATION

This application claims priority under 35 U.S.C. § 120 to U.S. Patent Application No. 62/650,614 filed on Mar. 30, 2018, the content of which is hereby incorporated by reference in its entirety.

FIELD

The present disclosure relates to power generation in an electric utility, and particularly electrical generation and storage using renewable energy sources.

BACKGROUND INFORMATION

Electrical utilities have used many strategies and techniques for combining energy storage components and renewable energy sources. These combination strategies, however, present numerous challenges and disadvantages for electrical power production and management.

For example, AC coupled systems have many interconnection transformers, increasing fault current at the point of interconnection with the utility, and require sophisticated reverse power relays to prevent excess current from entering the grid. In addition, AC-coupled systems use independent inverters and transformers for each energy source, which increase operating costs. AC-coupled systems are also slow to respond to some grid commands, such as fast frequency response, because the control system must coordinate multiple inverters at the same time.

DC-coupled architectures that use DC/DC devices on the energy storage system input only require an inverter to manage photovoltaic (PV) maximum power point tracking (MPPT) at the same time, resulting in control instability, difficulty in transitioning from day to night operation requirements, and reduced equipment efficiencies. DC-coupled architectures that use DC/DC devices on the PV input suffer only from reduced inverter efficiency, higher DC fault currents, and increased costs due to the larger DC conductors required to handle the increased current. Expansion of the storage system to include additional batteries is difficult because, generally, the voltage rating of the new equipment does not match the voltage rating of the old equipment.

In known AC-coupled systems, sophisticated metering is required to prove that the use of PV energy charged to the batteries is compliant with the Investment Tax Credit, or other similar incentive programs that require energy used to charge batteries is from a renewable energy source. In another example, AC coupled systems must convert energy through more devices to charge batteries from the renewable source, increasing system losses, and reducing the amount of renewable energy which can be harvested. If excess energy is available on the renewable system, it cannot be used to charge the batteries, due to the limit of the renewable inverter's maximum power.

SUMMARY

An exemplary power system is disclosed, comprising: a DC power bus; a photovoltaic system connected to the DC power bus; an energy storage system connected to the DC power bus and configured to store energy injected to the DC power bus by the photovoltaic system; a power inverter connected to the DC power bus, the power inverter configured to convert power between the DC power bus and an AC connected load; and a control system configured to: receive power system data from one or more sub-systems and devices connected to the DC power bus; and control, in real-time, one or more of the power inverter and the energy storage system to act as a load on the DC power bus based on the received power system data.

An exemplary control system for a power system having a renewable energy source and an energy storage system is disclosed, the control system comprising: a control circuit configured to receive power system data from one or more sub-systems and devices of the power system connected to a common DC power bus; and control, in real-time, one or more of a power inverter and the energy storage system of the power system to act as a load on the DC power bus based on the received power system data, wherein the control system is configured to, in real-time, increase or decrease real power injected to an AC connected load in response to a change in frequency on the AC connected load, wherein the control system is configured to, in real-time, increase or decrease reactive power injected to the AC connected load in response to a change in voltage on the AC connected load, wherein the control system is configured to, in real-time, increase or decrease real power injected to the AC connected load based on a state of the energy storage system by controlling current setpoints of the power inverter and energy storage system, wherein the control system is configured to, in real-time, restrict a rate of increase or decrease in power injected to the AC connected load to a specified percent per second (%/s), wherein the control system is configured to balance a state of charge of one or more energy storage systems in an energy storage facility, and wherein the control system is configured to control the power inverter to remain connected to the AC connected load during one or more fault events on the AC connected load.

BRIEF DESCRIPTION OF THE DRAWINGS

Other features and advantages of the disclosure will appear upon reading the following detailed description of embodiments of the invention, provided solely for information and with reference to the appended drawings, as follows:

FIG. 6B is a chart of measured signal values during the Clip Harvesting Mode of FIG. 6A in accordance with an exemplary embodiment of the present disclosure.

FIGS. 7A and 7B illustrate a process of managing the generation, supply, and harvest of a renewable energy source in accordance with an exemplary embodiment of the present disclosure.

Although specific features of various exemplary embodiments of the disclosure can be shown in some drawings and not in others, this is for convenience only. In accordance with the principles of the disclosure, any feature of a drawing can be referenced and/or claimed in combination with any feature of any other drawing.

DETAILED DESCRIPTION

Reference will now be made in detail to the various embodiments, one or more examples of which are illustrated in each figure. Each example is provided by way of explanation and is not meant as a limitation. For example, features and/or method steps illustrated or described as part of one embodiment and/or method can be used on or in conjunction with other exemplary embodiments and/or method steps to yield yet further exemplary embodiments or methods. It is intended that the present disclosure includes such modifications and variations.

The present disclosure is directed to a system and method of integrating multiple electrical generation and storage sources in a combined generation facility to allow for flexible, cost effective, reliable and efficient use of the renewable energy.

Figure 1:
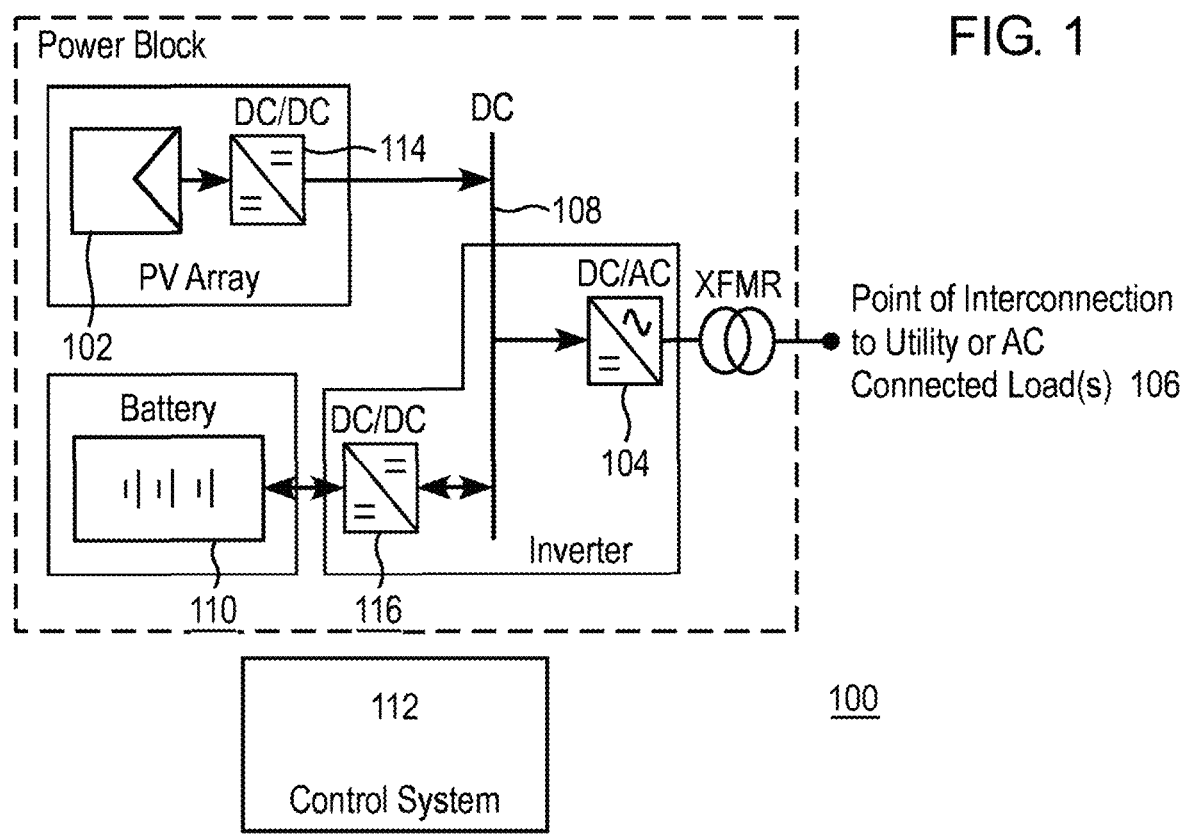
FIG. 1 illustrates a combination energy storage and renewable energy generation system in accordance with an exemplary embodiment of the present disclosure.

FIG. 1 illustrates a combination energy storage and renewable energy generation system in accordance with an exemplary embodiment of the present disclosure.

As shown in FIG. 1, the system 100 includes a renewable energy system 102, a power inverter 104, a control system 112, a DC power bus 108, and an energy storage system 110. The renewable energy system (RES) 102 can be any suitable system in which its energy source can be replenished. For example, renewable energy sources in accordance with exemplary embodiments of the present disclosure can include, wind power, solar (photovoltaic) power, geothermal power, biomass, and hydroelectric power. In accordance with an exemplary embodiment of the present disclosure the renewable energy system 102 can be implemented as an array of photovoltaic modules. The photovoltaic (PV) modules can include crystalline silicon, amorphous silicon, copper indium gallium selenide (CIGS) thin film, cadmium telluride (CdTe) thin film, and concentrating photovoltaic in which uses lenses and curved mirrors to focus sunlight onto small, but highly efficient, multi-junction solar cells.

The power inverter 104 is configured to convert power on the DC power bus 108 for use by AC connected loads 106. The AC connected load can include a power grid or a smaller local load such as a backup power system for a facility such as a hospital, manufacturing site, residential home, or other suitable facility as desired.

The BSS 110 can be a battery storage system (BSS) including plural batteries of any existing or future reusable battery technology including lithium ion, flow batteries, or mechanical storage such as flywheel energy storage, compressed air energy storage, a pumped-storage hydroelectricity, gravitational potential energy, or a hydraulic accumulator.

The control system 112 can include one or more processors or computing devices configured to perform closed loop management of real and reactive power supplied to an AC connected load 106. The control system 112 is configured to receive power system data from one or more of subsystems and devices connected to the DC power bus 108. The one or more subsystems can include the renewable energy system 102, the AC connected loads 106, the BSS 110, a weather station (not shown) or any other components, systems, or devices of an electrical power system. The devices connected to the DC power bus can include sensors configured to detect or monitor various system parameters such as power, voltage, current, and/or impedance The control system 112 can also be configured to control, in real-time, one or more of the power inverter 104 and the BSS 110 to act as a load on the DC power bus 108 based on the received power system data. The control system can be configured to generate outputs in the form of real and reactive power commands to the power inverter 104, trip commands for the protection of the one or more subsystems, real-time status information to an operator and the utility. The one or more processors and computing devices can be specially programmed to implement a programmable logic controller (PLC)-based control system and/or PC-based supervisory control and data acquisition (SCADA) system.

The power system 100 can also include an RES power converter 114 configured to convert power flowing between the RES 102 and the DC power bus 108. The power converter 114 can be uni-directional or bi-directional. The RES power converter 114 can be a standalone component or can be combined with (e.g., included in the same housing) as one of the power inverter 104 or the RES 102. According to an exemplary embodiment, the RES power converter 114 can be configured as nominal string level DC/DC converter having a predetermined power setpoint of 24 kW, and a maximum input voltage of 1500V. The power converter 114 can be distributed among the PV array. According to yet another exemplary embodiment, the RES power converter 114 can have a predetermined output voltage setpoint of a constant 1200V.

The power system 100 can also include a BSS power converter 116 configured to convert power flowing between the BSS 110 and the DC power bus 108. The BSS power converter 116 is bidirectional. According to an exemplary embodiment the BSS power converter 116 can be combined (e.g., included in same housing) with one of the power inverter 104 or the BSS 110. According to another exemplary embodiment of the present disclosure, the BSS power converter 116 can include a 1400 kW unit integrated with the inverter, with a 1300V maximum input voltage and a 1200V output voltage. The BSS power converter 116 is configured for combination and/or use with a lithium ion battery system having a native voltage of 700-1300V. According to yet another exemplary embodiment, other voltage ranges of the BSS 110 can be implemented based on a voltage rating of the BSS power converter 116.

As shown in FIG. 1, the DC power bus 108 is common to the RES 102, the power inverter 104 and the BSS 110. The advantages of this arrangement over existing systems will become apparent from the description that follows.

Figure 2:
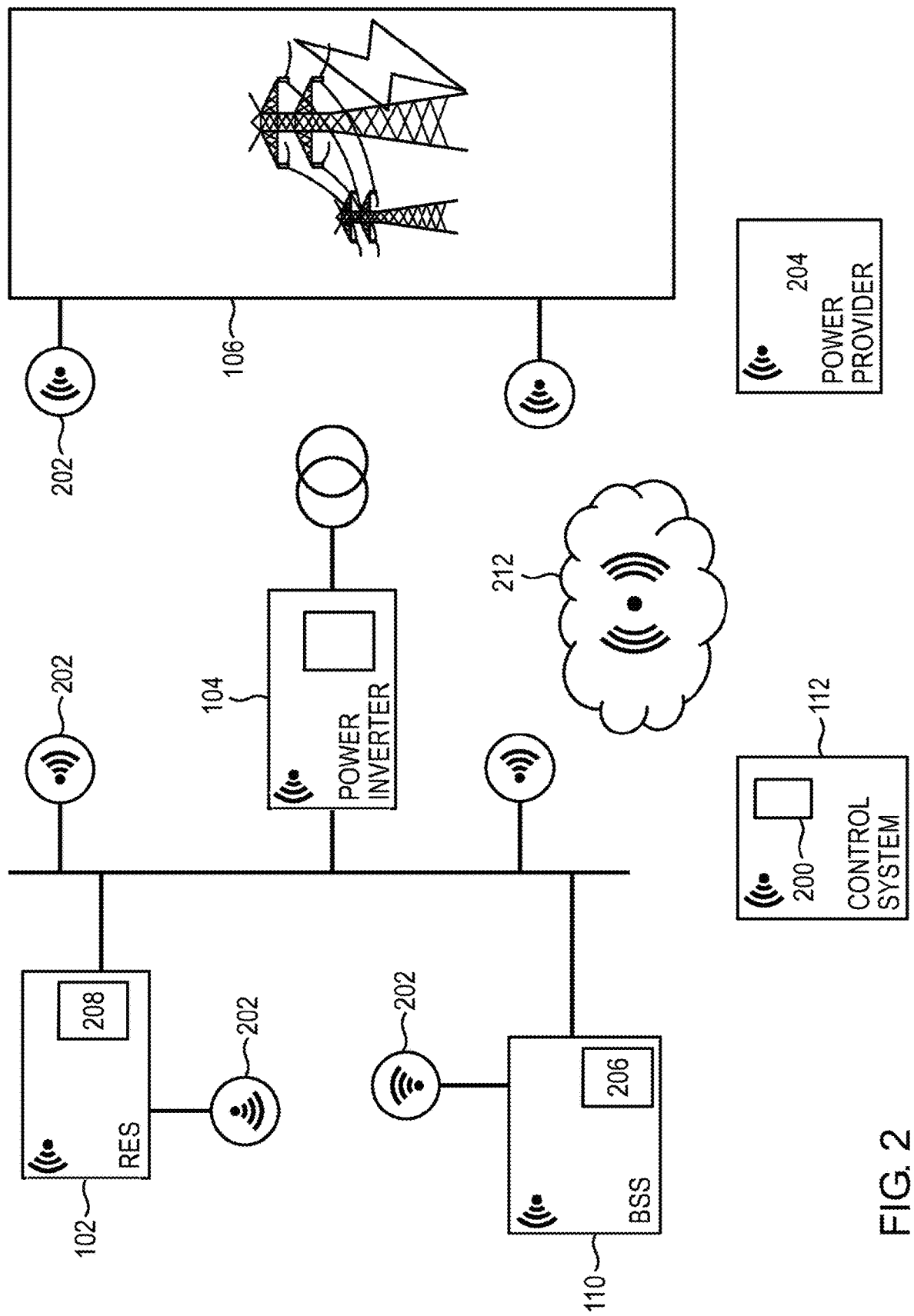
FIG. 2 illustrates a control system in accordance with an exemplary embodiment of the present disclosure.

FIG. 2 illustrates a control system in accordance with an exemplary embodiment of the present disclosure.

As shown in FIG. 2, the control system 112 includes one or more processors of a control circuit 200 and one or more sensors 202 connected to measure parameters on the DC power bus 108, the AC connected load(s) 106, and measure the status and/or parameters of other subsystems and components connected to the DC power bus 108 including the RES 102, the power inverter 104, and the BSS 110. The sensors 202 can be arranged to connect and/or communicate on a wired or wireless network 212. For example, according to an exemplary embodiment the one or more sensors 202 can be distributed throughout the power system 100 and interconnected in a mesh network protocol and topology or other suitable network configuration as desired. The control system 112 is also connected to communicate with a power provider 204 of a utility or power provider associated with the AC connected load(s) 106. The control circuit 200 can be configured to receive the measured parameters and/or power system data from the one or more sensors 202 as an input signal encoded with one or more of status data, condition data, current data, voltage data, dispatch data, AC connected load data or power grid data, or weather data. The control circuit 200 can also be configured to receive a dispatch signal from the power provider 204 of the power provider as an input signal encoded with dispatch data. The dispatch data can include the status of the AC connected load (e.g., power grid) 106, parameters of the AC-connected load, and an instruction for dispatching real and/or reactive power from the RES 102 to the AC connected load 106. It shall be understood that the input signals can be communicated over a wired or wireless network 212 and can be encrypted according to any known or suitable encryption technique or scheme.

The one or more processors or control circuit 200 of the control system 112 can be configured to process the input signals received from the one or more sensors 202 and the power provider 204 to control the injection of power from one or more of the RES 102 and the BSS 110 to the AC connected load 106. For example, the control circuit 200 can be configured to initiate one or more modes of operation for the control system 112 based on the input signals received. These modes include Active Power Control, Active Power Control with PV Overflow, Peak Shifting, and Clip Harvesting. For each mode, the control circuit 200 can be configured to generate command signals for controlling, in real-time, at least the power inverter 104 and the BSS 110. The command signals are generated in the form of real or reactive power. Real-time communication in the context of the present disclosure includes a response time greater than or equal to 40 milliseconds or approximately 2.5 cycles, and up to 1 second. The real-time response includes no intentionally added delays for the time in which a control signal is generated in response to one or more input signals and/or a status or status change in one or more components or sub-systems of the power system 100.

According to an exemplary embodiment, the control circuit 200 can be configured to, in real-time, increase or decrease reactive power injected onto the AC-connected load(s) 106 in response to a change in voltage on the AC-connected load(s) 106. The increase or decrease in reactive power is achieved by controlling the power inverter 104 to act as a load on the DC power bus 108 in response to an analysis of the voltage of the AC connected load(s) 106 relative to a set point and a dynamically generated response curve. The response curve can be generated by the control circuit 200 based on preset values or supplied by the power provider 204 of the power provider. For example, the analysis can include a comparison of the AC connected load voltage with a predetermined or predefined setpoint for the AC connected load(s) 106. The comparison can be made for a number of measured values over a specified period. By prioritizing the various functions, the control circuit 200 can simultaneously implement a volt/VAR response curve (increase or decrease in reactive power to the AC connected loads 106 in response to a change in AC voltage), a frequency/kW response curve (increase or decrease in real power to the AC connected loads 106 in response to a change in AC frequency), and a volt/kW response curve (increase or decrease in real power to the AC connected loads 106 in response to a change in AC voltage). The control circuit 200 manages multiple response curves by measuring signals from sensors 202, and sending current setpoint values to any or all of the RES 102, the BSS 110 or the power inverter 104. The response curves can be communicated to other electronic or computing devices connected to the network 212, or output to a display or other suitable graphical interface at the control system 112.

According to an exemplary embodiment, the control circuit 200 can be configured to, in real-time, increase or decrease real power injected onto the AC connected load(s) 106 based on a state of the BSS 116. For example, the control circuit 200 can be configured to control the current set point of the power inverter 104 and the BSS 110 based on one or more parameters of the BSS 110 including state of charge, status, voltage, current, or temperature measurements. These measurements and/or signals can be received from the BSS control circuit 206 and/or the one or more sensors 202. For example, the control circuit 200 can compare the BSS 110 parameters to predefined setpoints or ranges of a specified parameter to determine a status of operation of the BSS 110. In one example, the BSS 110 state of charge signal could indicate that the system is near full charge, causing power inverter 104 to increase the load on the DC power bus 108, and inject additional power to the AC connected loads or power grid 106. In another example, a low state of charge in BSS 110 could indicate that the system lacks enough charge to meet a later scheduled dispatch to the AC connected loads 106, causing the power inverter 104 to reduce the load on the DC power bus 108, allowing BSS 110 to increase the load, and charge from the available energy.

According to yet another exemplary embodiment, the control circuit 200 can be configured to, in real-time, restrict the rate of increase or decrease in power injected to the AC connected load(s) 106 to a specified percent per second (%/s). For example, the control circuit 200 can be configured to control the current set point of the power inverter 104 and the BSS 110 based on the value of a predefined set point or a set point value sent or transmitted by the power provider 204 of the power provider 204. In one example, the control circuit 200 has a predefined setpoint restricting the rate of change of power at the AC connected loads 106. If the energy available to the renewable energy system 102 increases rapidly (due to a sudden increase in solar irradiance or wind speed, for example), the control system 112 can gradually increase the current setpoint of the power inverter 104 to follow the predefined rate of change, and simultaneously increase the current setpoint of the BSS 110 such that it acts as a load on the DC bus 108. Thus, the BSS 110 will store the excess energy available during the period of restricted rate of change at the AC connected loads 106.

According to an exemplary embodiment, the control circuit 200 can be configured to balance a state of charge of one or more energy storage systems in the BSS 110. For example, the control circuit 200 can be configured to control a current set point of the BSS 110 based on the current set point of the power inverter 104, the state of charge of the BSS 110, and the current available on the DC power bus. For example, if one individual unit comprising the BSS 110 has a state of charge lower than the average state of charge of all of the units comprising the BSS 110, the control system 112 can vary the current setpoint of each individual unit, where applicable, thereby allowing those units with lower state of charge to absorb more current from the DC bus 208, and thus arrive at the average state of charge in a shorter period of time than if the current setpoints were not varied. In this way, excess current available on the DC bus 208 can be prioritized by the control system 112 to ensure the maximum harvest of energy from the RES 102.

According to another exemplary embodiment, the control circuit 200 can be configured to control the power inverter 104 to remain connected or maintain a connection to the AC connected load(s) 106 during one or more fault events on the power grid. For example, the control circuit 200 can be configured to control the operation of the power inverter 104 and the BSS 110 to provide auxiliary power to the other subsystems and/or components of the power system 100 during a fault condition. As a result, the control system 112 can initiate a normal system operation upon measurement of normal operating conditions via the one or more sensors 202.

According to yet another exemplary embodiment, the control circuit 200 can be configured to control the power inverter 104 to act as a load during an outage of the AC connected load(s) 106, and inject voltage, current, and reactive power to the AC connected load(s) 106 during restart from the outage. For example, the control circuit 200 can be configured to respond to user input or automatically generated command signals to operate without an external voltage reference until normal power grid operation has resumed. These conditions can determine when the control system 112 will respond to a manual or automatic command signal to resume normal operation.

It should be understood that the operations and functions performed by the control circuit 200 in relation to the power inverter 104, BSS 110, and RES 102 can be performed in combination with or alternatively by the power inverter control circuit 204, the BSS control circuit 206, and the RES control circuit 208, respectively. The use of a common bus voltage allows each sub-system and/or component connected to the DC power bus 108 to independently respond to the conditions present (e.g., voltage, current, and control signals) on the DC power bus 108. As a result, smooth transitions between supplying power to the AC connected load(s) 106 night or day can be realized. Moreover, the maximum energy harvesting of the RES 102 generated power via the BSS 110 can be achieved. A common voltage on the DC power bus 108 allows for flexibility in the types of technology employed by the various subsystems and components connected to the DC power bus 108. Known RES implementations using PV arrays in combination with energy storage systems do not fully appreciate the practical realities related to the interconnection of the combined PV energy storage system with a power provider and achieving incentive compliance. DC coupling according to the exemplary embodiments discussed herein makes the system more practical from a utility perspective, safer for utility workers, and easier to integrate into existing interconnection programs. The power system 100 of the present disclosure can be a bolt-on or add-on system for existing interconnections, because it does not change how the system interacts with a utility or AC connected load(s) from a fault and protection perspective.

Figure 3:
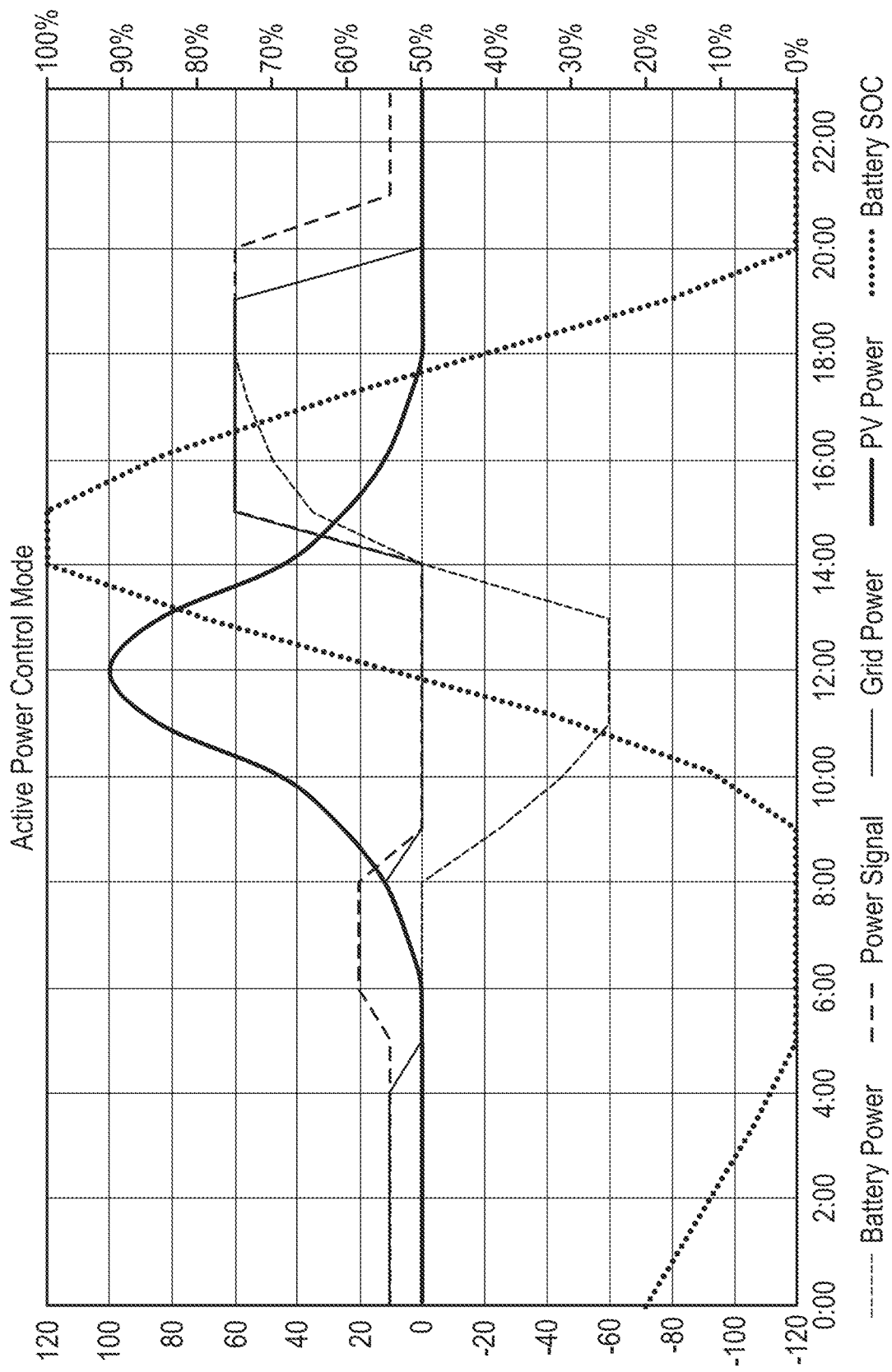
FIG. 3 is an exemplary signal graph of during an Active Power Control Mode in accordance with an exemplary embodiment of the present disclosure.

FIG. 3 is an exemplary signal graph of during an Active Power Control Mode in accordance with an exemplary embodiment of the present disclosure. During the Active Power Control Mode the power system 100 attempts to maintain requested real power signal from either or both the RES 102 or the BSS 110. According to an exemplary embodiment, the control circuit 200 can be configured to initiate an Active Power Control Mode in which the system responds to an input signal encoded as a real power dispatch signal from the power provider 204 and matches the dispatch instructions as close as possible. In the Active Power Control mode, if excess energy is available, which includes energy above a predefined input setpoint of the power inverter 104 and energy that cannot be injected to the power grid or AC connected load, the excess is sent to the BSS 110, if the BSS 110 is at 100% state of charge, only then will the excess energy be curtailed by the control circuit 200 commanding the RES 102 to reduce real power output. According to an exemplary embodiment, the RES 102 is a PV array, and the one or more processors 202 control the RES power converter 114 to inject current onto the DC power bus 108. This injection occurs if irradiance is available at the PV array and the input signal from the power provider 204 is encoded with discharge data indicating that there is use for the current at the AC connected load(s) 106, and at least one other input signal indicating that the BSS 110 is not at full charge capacity. The control circuit 200 controls the power inverter to act as a load on the DC power bus 108 based on the dispatch data encoded in the input signal received from the power provider 204 of the power provider. According to the power requested in the dispatch data of the input signal, both the power inverter 104 and the BSS 110 can be controlled simultaneously to act as loads on the DC power bus 108 so that excess energy over the predefined input setpoint of the power inverter 104 is sent to the BSS 110. While in the Active Power Control mode, the control system 112 is configured to match the real power output requested in the dispatch data received from the power provider 204 until the irradiance at the PV array or the battery state of charge at the BSS 110 is exhausted.

The BSS 110 can include one or more processors or a control circuit 206 configured to receive input signals from the one or more sensors 202 connected to the DC power bus 108, and receive command signals from the control system 112. Based on the received signals, the control circuit 206 analyzes the received input and/or command signals, and controls an operating mode of BSS 110 based on the analysis. Similarly, the RES 102 includes one or more processors or a control circuit 208 that is configured to receive input signals from the one or more sensors 202 and command signals from the control system 112. The control circuit 208 can control the operating mode of the RES 102 based on an analysis of the received input and/or command signals. The BSS and RES control circuits 206, 208 are provided limited control over the operation of the BSS 110 and RES 102, respectively. The control circuit 200 of the control system 112 is configured to override the operation and/or command signals issued by the BSS and RES control circuits 206, 208 as necessary to maintain operation of the power system 100 within predefined specifications.

The power inverter 104 can include one or more processors or a control circuit 210 configured to receive frequency measurements from the AC connected load(s) 106 and control the injection of power or current to the AC connected load(s) 106 based on the measurements. For example, the control circuit 210 can be configured to, in real-time, increase or decrease real power injected onto the power grid in response to a change in frequency on the AC connected load(s) 106 (e.g., power grid). The control circuit 210 can be configured to control the power inverter 104 to act as a load on the DC power bus 108 and generate a control signal for increasing or decreasing the real power of the power inverter 104 in response to an analysis of the frequency of the AC connected load(s) 106. The analysis of the frequency is relative to a setpoint and a dynamically generated response curve. The response curve can be generated in the control circuit 210 based on preset values or generated by the power provider 204 of the power provider and supplied (e.g., transmitted or communicated) to the control circuit 210 over the network 212.

Figure 4:
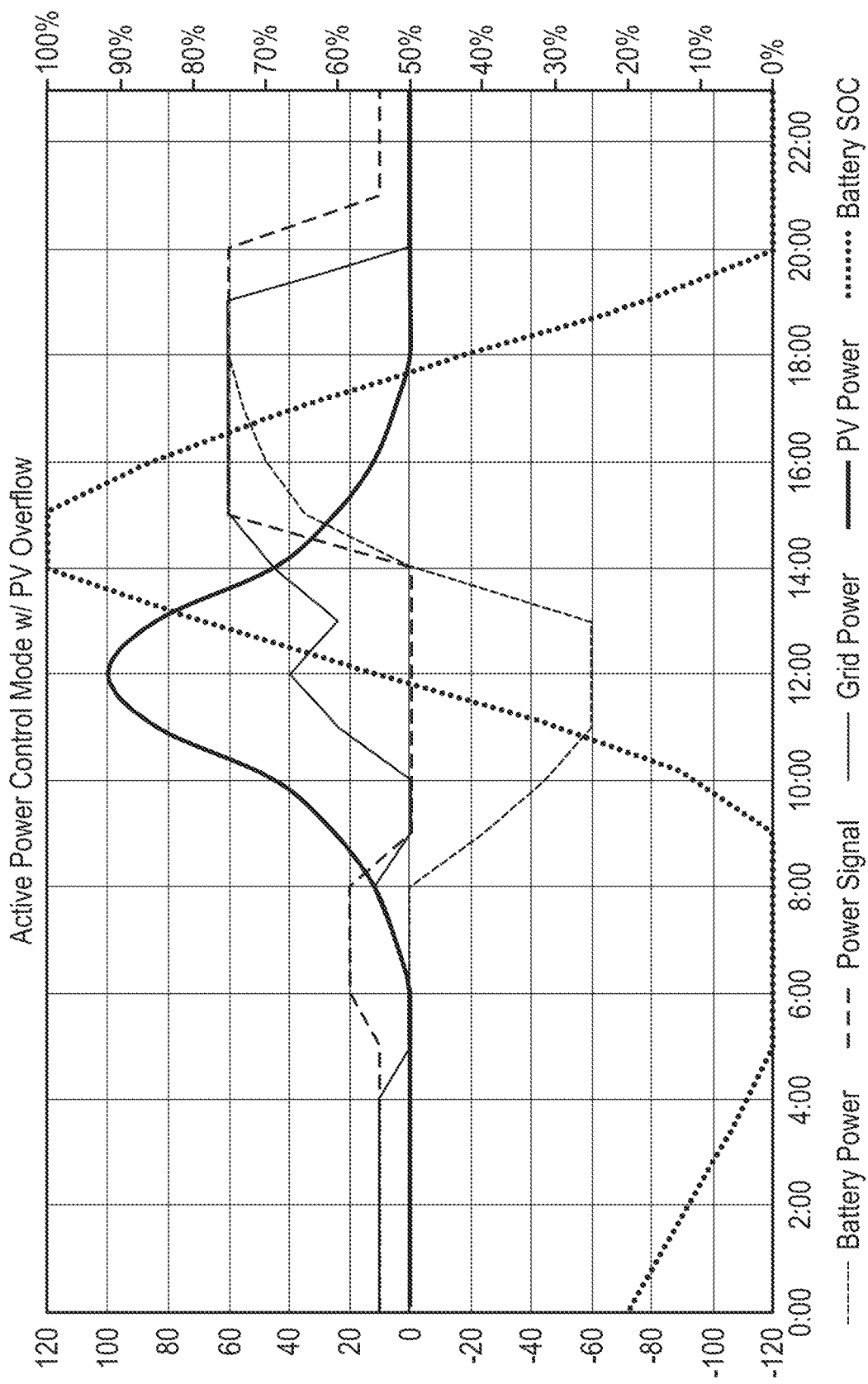
FIG. 4 is an exemplary signal graph of during an Active Power Control with PV Overflow Mode in accordance with an exemplary embodiment of the present disclosure.

FIG. 4 is an exemplary signal graph of during an Active Power Control with PV Overflow Mode in accordance with an exemplary embodiment of the present disclosure. During the Active Power Control with PV Overflow Mode, the power system 100 attempts to maintain the requested real power signal. However, if excess PV energy is available on the DC power bus 108 the dispatch signal may be exceeded. According to another exemplary embodiment, the control circuit 200 can be configured to initiate the Active Power Control with PV Overflow mode in response to an input signal encoded as a real power dispatch signal from the power provider 204 and matches the dispatch instructions as close as possible. However, unlike the Active Power Control mode if excess PV energy is available and the BSS 110 is fully charged, the excess energy is dispatched directly to the AC connected loads 106. That is, if the current injected onto the DC power bus 108 by the RES 102 (e.g., PV array) exceeds an input setpoint of the power inverter 104, then the control circuit 200 controls, in real-time, both the power inverter and the BSS 110 to act as loads on the DC power bus 108 so that current is injected to the AC connected load(s) 106 and the excess current is stored in the BSS 110. According to an exemplary embodiment, the control circuit 200 control the RES power converter 114 to inject current onto the DC power bus 108 if irradiance is available at the PV array and the input signal from the power provider 204 is encoded with discharge data indicating that there is a use for the current at the AC connected load(s) 106. The BSS power converter 116 is controlled for performing a DC/DC conversion for power flowing from the DC power bus 108 to the BSS 110. In addition, the control circuit 200 controls the BSS power converter 116 to allow the BSS 110 to supplement the PV energy injected to the AC connected load(s) 106, by performing a DC/DC conversion for power flowing from the BSS 110 to the DC power bus 108. Under the Active Power Control with PV Overflow mode, the control system 112 is configured to meet or exceed the real power output requested in the dispatch data received from the power provider 204 until the irradiance at the PV array or the battery state of charge is exhausted.

Figure 5:
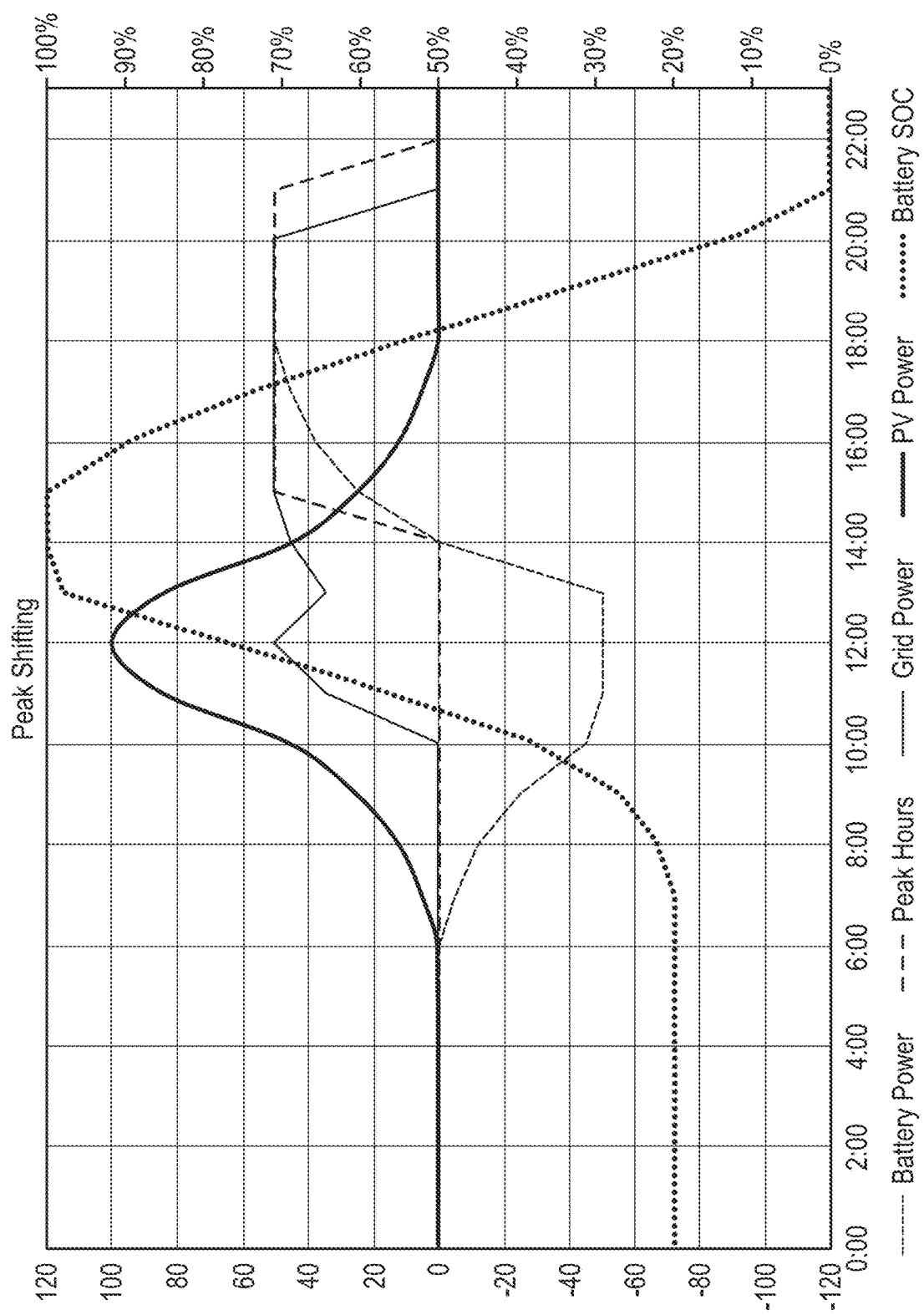
FIG. 5 is an exemplary signal graph of during a Peak Shifting Mode in accordance with an exemplary embodiment of the present disclosure.

FIG. 5 is an exemplary signal graph of during a Peak Shifting Mode in accordance with an exemplary embodiment of the present disclosure. In the Peak Shifting Mode, the power system 100 is configured to store energy throughout the daytime hours to reach 100% state of charge in the BSS 110 in time for a defined set of peak hours during which the power from the BSS 110 is increased to a predefined energy output setpoint. According to an exemplary embodiment, the control circuit 200 can be configured to initiate the Peak Shifting mode in which energy delivery is maximized during a defined block peak of hours based on the dispatch data encoded in the input signal from the power provider 204. If the power provider 204 does not provide an input signal to the control circuit 200, the peak hours may be a predefined schedule encoded in control system 112. In an exemplary embodiment, if the RES 102 is a PV array, the control circuit 200 controls the RES power converter 114 to inject current onto the DC power bus 108 if irradiance is available at the PV array. Under the Peak Shifting mode, the energy generated by the PV array is stored in the BSS 110 until it is needed for the AC connected load during hours for peak use. As such, the control circuit 200 controls the BSS power converter 116 to perform a DC/DC conversion for power flowing from the DC power bus 108 to the BSS 110. While in the Peak Shifting Mode, either the power inverter 104 or the BSS 110 are controlled to act as loads on the DC power bus 108 so that excess energy on the DC power bus 108 which is over the predefined input setpoint of the power inverter 104 is sent to the BSS 110. During peak hours, both the BSS power converter 116 and the power inverter 104 are controlled to inject the energy on the DC power bus 108 for supplying the AC connected load(s) 106 via the power inverter 104. Under the Peak Shifting mode, the power system 100 is controlled to behave as if it were a standalone RES 102 until peak hours when power needs on the AC connected load(s) increase. During peak hours, the amount of power injected onto the DC power bus 108 by the RES 102 and the BSS 110 is increased to deliver maximum energy to the AC connected load(s).

Figure 6A:
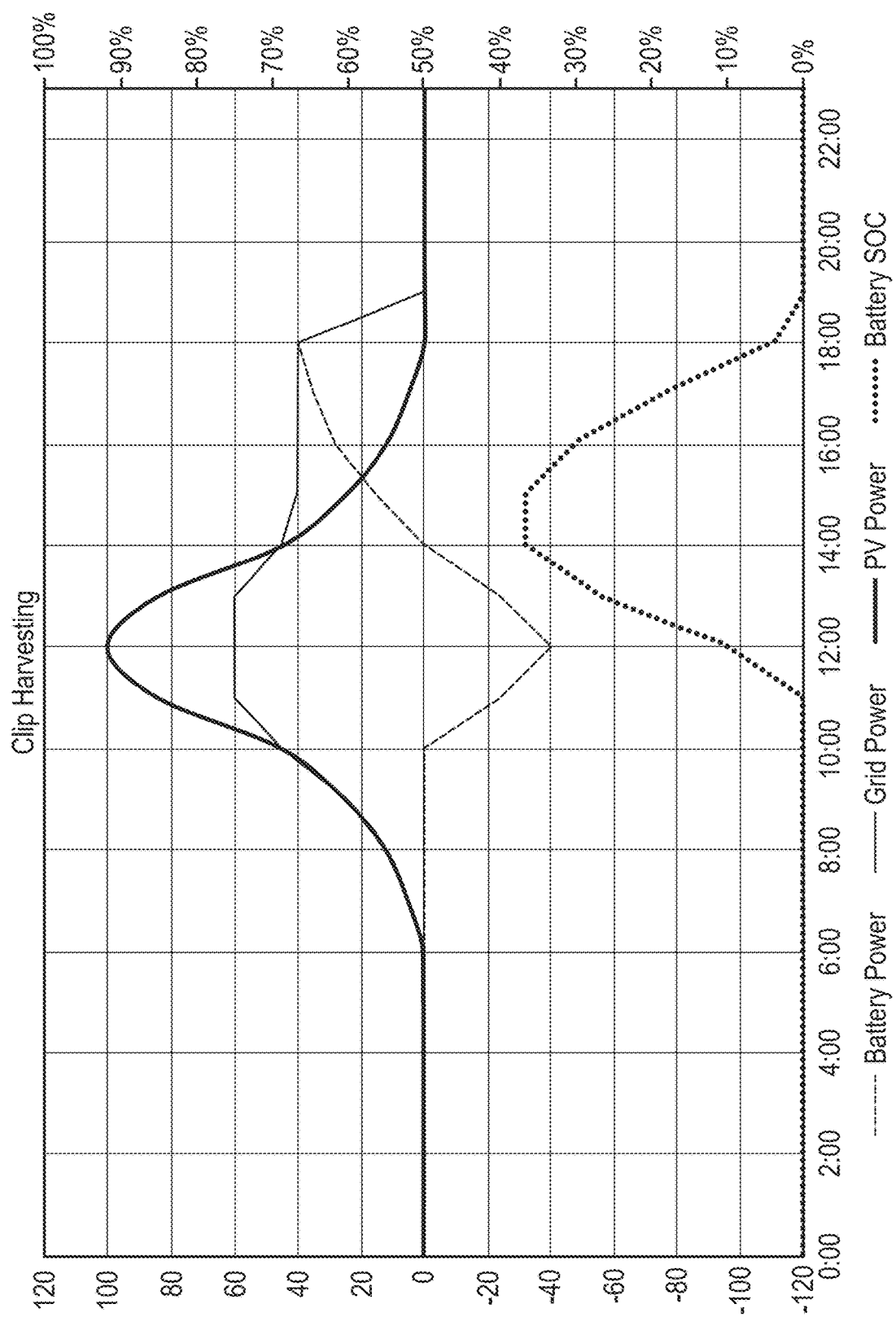
FIG. 6A is an exemplary signal graph of during a Clip Harvesting Mode in accordance with an exemplary embodiment of the present disclosure.

FIG. 6A is an exemplary signal graph of during a Clip Harvesting Mode in accordance with an exemplary embodiment of the present disclosure. In the Clip Harvesting Mode, the power system 100 charges the BSS 110 with only excess energy from the PV array 102, which is above the input setpoint of the power inverter 104. This excess energy can be stored in the BSS 110 and dispatched to the AC connected load(s) 106 at a later time (e.g., during evening hours, or predetermined peak hours of the power provider). FIG. 6B is a chart of measured signal values of the Clip Harvesting Mode of FIG. 6A in accordance with an exemplary embodiment of the present disclosure. As shown in FIG. 6B, the inverter 104 maximum power is set at 60 MW, the storage capacity of BSS 110 is at 240 MWhs and the maximum power rating of BSS 110 is at +/−100 MW.

According to an exemplary embodiment, the control circuit 200 can be configured to initiate the Clip Harvesting mode in response to the input signal encoded as a real power dispatch signal from the power provider 204, the power system harvests excess PV energy via the BSS 110 and injects energy generated by the RES 102 to the AC connected load 106 via the power inverter 104. In an exemplary embodiment, the RES 102 is a PV array and the control circuit 200 controls the RES power converter 114 to inject current onto the DC power bus 108 if irradiance is available at the PV array (e.g., RES 102). If the power injected onto the DC power bus 108 exceeds a predetermined input setpoint of the power inverter 104, the control circuit 200 control the BSS power converter 116 to perform a DC/DC conversion for power flowing from the DC power bus 108 to the BSS 110 so that the excess energy is stored in the BSS 110. According to the power requested in the dispatch data of the input signal, both the power inverter 104 and the BSS 110 can be controlled simultaneously to act as loads on the DC power bus 108 so that excess energy over the AC power set point is sent to the BSS 110. During evening hours or predetermined peak hours, both the BSS power converter 116 and the power inverter 104 are controlled to inject the current on the DC power bus 108 to the AC connected load(s) 106. Under the Clip Harvesting mode, the power system 100 behaves like a standalone RES 102, with the additional capability of harvesting energy normally lost to clipping. The energy stored in the BSS 110 is dispatched to the AC connected load(s) 106 gradually during evening or off-peak hours to supplement the energy supplied by the RES 102.

Figure 7B:
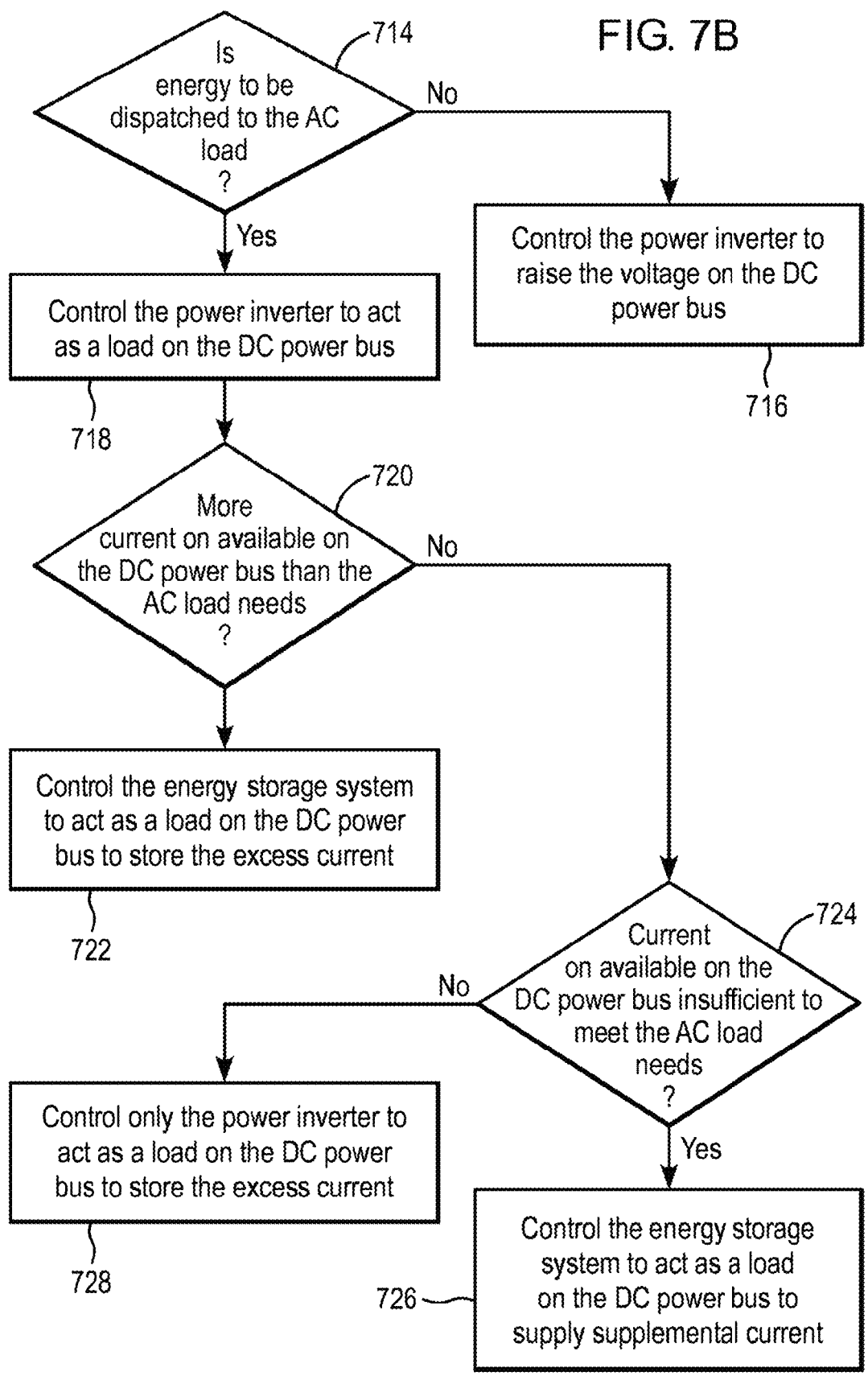

FIGS. 7A and 7B illustrate an operating process of the power system in accordance with an exemplary embodiment.

The control circuit 200 of the control system 112 activates the power inverter 104 by providing a voltage set point of the DC power bus 108 (step 700). For example, the DC power bus 108 can be controlled to establish a common voltage of 1200V. The RES 102 harvests energy in the form of voltage and current. For example, for a PV array implementation, the photovoltaic modules are activated and harvestable energy at the input of the RES power converter 114 is measured (Step 702). The control system 112 receives input signals from one or more sensors 202 connected to the power system 100 and the power provider 204 (Step 704). The control circuit 200 measures the common voltage on the DC power bus 108 (S706). The control circuit 200 determines whether the measured voltage is within the setpoint range (step 708). Energy is harvested from the RES 102 by outputting current from the RES 102 to the DC power bus 108 (S710). The RES power inverter 114 uses a Maximum Power Point Tracking (MPPT) to convert the variable input voltage and current from the PV modules in the PV array to a constant voltage/variable current output to the DC power bus 108. The control circuit 200 either independently or in combination with any of the BSS control circuit 206, RES control circuit 208, or power inverter control circuit 210 directs the current from the DC power bus 108 to/from the BSS power converter 116 or the power inverter 104 (Step 712). If based on the dispatch data encoded in the input signal from the power provider 204 (Step 714), none of the power inverter 104 nor the BSS 110 is able to accept current due to the current settings (e.g., 0 MW dispatch to grid and battery state of charge at 100%), then the control circuit 200 controls the RES power converter 114 to reduce the power output to 0 MW, such as by increasing the voltage on DC bus 108, or sending a command to RES control circuit 208 (Step 716). When the dispatch data in the input signal from the power provider 204 indicates that energy is to be sent to the AC connected load(s) 106, then the control circuit 200 controls the power inverter 104 to act as a load on the DC power bus 108 so that DC current can be converted to AC and injected into the AC connected load(s) 106 (Step 718). If it is determined that there is more current available than is needed on the grid (Step 720), then the control circuit 200 controls the BSS power converter 116 to act as a load on the DC bus, such that DC current on the DC power bus 108 is moved to the BSS 110, thereby increasing the state of charge of the BSS 110 (Step 722). If it is determined that the RES current is insufficient to meet the requested AC output provided in the dispatch data encoded in the input signal from the power provider 204, and a BSS 110 state of charge is available (Step 724), then the control circuit 200 will control the BSS power converter 116 to act as a source on the DC bus and will move the current from the BSS 110 to the DC power bus 108, thereby reducing the BSS 110 state of charge (Step 726), otherwise the power inverter 104 will be controlled to act as a load on the DC power bus 108.

According to another exemplary embodiment, in which a non-PV energy source is used, metering or regulating the amount of energy placed onto the DC power bus 108 can include direct control from the control circuit 200 of the control system 112, or a combination of the RES control circuit 208 and the control circuit 200.

According to exemplary embodiments of the present disclosure the one or more processors and control circuits can include one or more of any known general purpose processor or integrated circuit such as a central processing unit (CPU), microprocessor, field programmable gate array (FPGA), Application Specific Integrated Circuit (ASIC), or other suitable programmable processing or computing device or circuit as desired that is specially programmed to perform operations for achieving the results of the exemplar embodiments described herein. The processor(s) can be configured to include and perform features of the exemplary embodiments of the present disclosure such as, a method for providing, storing, or harvesting energy generated by a renewable energy source. The features can be performed through program code encoded or recorded on the processor(s), or stored in a non-volatile memory device, such as Read-Only Memory (ROM), erasable programmable read-only memory (EPROM), or other suitable memory device or circuit as desired. Accordingly, such computer programs can represent controllers of the computing device.

In another exemplary embodiment, the program code can be provided in a computer program product having a non-transitory computer readable medium, such as Magnetic Storage Media (e.g. hard disks, floppy discs, or magnetic tape), optical media (e.g., any type of compact disc (CD), or any type of digital video disc (DVD), or other compatible non-volatile memory device as desired) and downloaded to the processor(s) for execution as desired, when the non-transitory computer readable medium is placed in communicable contact with the processor(s).

The one or more processors can be included in a computing system that is configured with components such as memory, a hard drive, an input/output (I/O) interface, a communication interface, a display and any other suitable component as desired. The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, or any other suitable network communication interface as desired. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, or any other suitable communication link as desired.

Where the present disclosure is implemented using software, the software can be stored in a computer program product or non-transitory computer readable medium and loaded into the computing device using a removable storage drive or communications interface. In an exemplary embodiment, any computing device disclosed herein can also include a display interface that outputs display signals to a display unit, e.g., LCD screen, plasma screen, LED screen, DLP screen, CRT screen, or any other suitable graphical interface as desired.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A power system, comprising:
a DC power bus;
a photovoltaic system connected to the DC power bus;
an energy storage system connected to the DC power bus and configured to store energy injected to the DC power bus by the photovoltaic system;

a power inverter connected to the DC power bus, the power inverter configured to convert a DC power from the DC power bus to an AC power for an AC connected load; and a control system configured to:
receive power system data from one or more of the photovoltaic system, the energy storage system, or other device connected to the DC power bus; and
control, in real-time, one or more of the power inverter and the energy storage system based on the received power system data, wherein the control system comprises: one or more processors; and one or more sensors connected to the DC power bus, wherein the one or more processors are configured to receive the power system data as an input signal including one or more of status data, condition data, current data, voltage data, dispatch data, power grid data, or weather data, wherein the control system is configured to, in real-time, increase or decrease real power injected to the AC connected load in response to a change in frequency on the AC connected load, and wherein the control system is configured to, in real-time, restrict a rate of increase or decrease in power injected to the AC connected load to a specified percent per second (%/s).

2. The system according to claim 1, comprising:
a power converter configured to convert a power flowing between the photovoltaic system and the DC power bus.

3. The system according to claim 2, wherein the power converter is a bi-directional power inverter.

4. The system according to claim 2, wherein the power inverter comprises the power converter.

5. The system according to claim 2, wherein the photovoltaic system and the power converter are integral.

6. The system according to claim 1, comprising:
a bi-directional power converter configured to convert power flowing between the energy storage system and the DC power bus.

7. The system according to claim 6, wherein the power inverter comprises the bi-directional power converter.

8. The system according to claim 6, wherein the energy storage system comprises the bi-directional power converter.

9. The system according to claim 1, wherein the other device connected to the DC power bus includes at least one of: one or more sensors connected to the DC power bus, one or more weather stations, or a server of a power provider.

10. The system according to claim 9, wherein an input signal received from the server of the power provider is a dispatch signal that includes dispatch data, and the control system controls the power inverter to act as a load on the DC power bus based on receipt of the dispatch signal from the server of the power provider.

11. The system according to claim 1, wherein the one or more processors is configured to generate command signals for controlling at least the power inverter and the energy storage system.

12. The system according to claim 11, wherein the power inverter is a bi-directional power inverter.

13. The system according to claim 1, wherein if the photovoltaic system places more current on the DC power bus than is needed on the AC connected load, the control system is configured to control, in real-time, the energy storage system to act as a load on the DC power bus for storing excess current.

14. The system according to claim 11, wherein, if a power dispatch signal is received from a server of a power provider, the control system controls the power inverter to act as a load on the DC power bus.

15. The system according to claim 14, wherein if data is received by the control system from the power inverter and/or the one or more sensors connected to DC power bus indicating that current injected on the DC power bus by the photovoltaic system exceeds an input setpoint of the power inverter, the control system controls, in real-time, both the power inverter and the energy storage system to act as loads on the DC power bus so that current is injected to the AC connected load and excess current is stored in the energy storage system.

16. The system according to claim 12, wherein, if current injected on the DC power bus by the photovoltaic system is less than the input setpoint of the AC connected load, the energy storage system discharges stored current onto the DC power bus to supplement the current injected on the DC power bus by the photovoltaic system and, and the power inverter is controlled, in real-time, to act as the load.

17. The system according to claim 1, wherein the energy storage system comprises a control circuit and a first bi-directional converter and the photovoltaic system comprises a control circuit and a second converter, and wherein the first bi-directional converter and the second converter have a common voltage for the DC power bus.

18. The system according to claim 17, comprising:
one or more sensors connected to the DC power bus and the AC connected load, wherein the control circuits of the energy storage system and the photovoltaic system are configured to receive input signals from the one or sensors connected to the DC power bus and command signals from the control system, analyze the received input and/or command signals, and control an operating mode of the photovoltaic system and the energy storage system, respectively, based on the analysis.

19. The system according to claim 18, wherein the input signals include voltage data and current data, and the command signals include control data.

20. The system according to claim 18, wherein the control system is configured to, in real-time, increase or decrease real power injected to the AC connected load in response to a change in frequency on the AC connected load by controlling the power inverter to act as a load on the DC power bus based on a change in frequency measured from the AC connected load via the one or more sensors,
wherein the control system is configured to analyze the frequency of the AC connected load relative to a setpoint and a dynamically generated response curve, and
wherein the response curve is generated by comparing predefined values of system parameters to measured values of the system parameters or is received from the server of the power provider.

21. The system according to claim 18, wherein the control system is configured to, in real-time, increase or decrease reactive power injected to the AC connected load in response to a change in voltage on the AC connected load by controlling the power inverter to act as a load on the DC power bus,
wherein the control system analyzes a measured voltage of the AC connected load relative to a setpoint and a dynamically generated response curve, and
wherein the response curve is generated by comparing predefined values of system parameters to measured values of the system parameters or is received from the server of the power provider.

22. The system according to claim 18, wherein the control system is configured to, in real-time, increase or decrease real power injected to the AC connected load based on a state of the energy storage system by controlling current setpoints of the power inverter and energy storage system based on one or more of measured parameters of the energy storage system, wherein the measured parameters include state of charge, operation status, voltage, current, or temperature.

23. The system according to claim 18, wherein the control system is configured to, in real-time, restrict the rate of increase or decrease in power injected to the AC connected load to a specified percent per second (%/s) by controlling current setpoints of the power inverter and the energy storage system based on a value of a predefined current setpoint or a current setpoint value received from the server of the power provider.

24. The system according to claim 18, wherein the control system is configured to balance a state of charge of the energy storage system by controlling a current setpoint of the energy storage system based on the value of the power inverter current setpoint, measured parameters of the energy storage system including a state of charge, and an amount of current measured on the DC power bus, wherein the energy storage system includes one or more energy storage systems in an energy storage facility.

25. The system according to claim 18, wherein the control system is configured to control the power inverter to remain connected to the AC connected load during one or more fault events on the AC connected load by controlling an operation of the power inverter and the energy storage system to provide auxiliary power to one or more sub-systems or components during the one or more fault events, wherein the control system initiates normal system operation upon normal operating conditions being measured by the one or more sensors.

26. The system according to claim 18, wherein the control system is configured to control the power inverter to act as a load during an outage of the AC connected load, and inject voltage, current, and reactive power to the AC connected load during restart from the outage in response to a command signal,
wherein the command signal is a manual or automatically generated signal and is encoded with data instructions for initiating operation without an external voltage reference until normal operation of the AC connected load has resumed.

27. The system according to claim 1, wherein the control system further comprises:
a control circuit configured to receive the power system data and to control, in real-time, one of the power inverter and the energy storage system based on the received power system data,
wherein the control system is configured to, in real-time, increase or decrease real power injected to the AC connected load in response to a change in frequency on the AC connected load,
wherein the control system is configured to, in real-time, increase or decrease reactive power injected to the AC connected load in response to a change in voltage on the AC connected load,
wherein the control system is configured to, in real-time, increase or decrease real power injected to the AC connected load based on a state of the energy storage system by controlling current setpoints of the power inverter and energy storage system,
wherein the control system is configured to, in real-time, restrict a rate of increase or decrease in power injected to the AC connected load to a specified percent per second (%/s),
wherein the control system is configured to balance a state of charge of one or more energy storage systems in an energy storage facility, and
wherein the control system is configured to control the power inverter to remain connected to the AC connected load during one or more fault events on the AC connected load.

28. The system according to claim 27, comprising:
one or more sensors configured to measure parameters of the one or more sub-systems and devices, parameters of the DC power bus, and parameters of the AC connected load.

29. The system according to claim 27, wherein the control circuit includes one or more of a first control circuit of the control circuit, a second control circuit of a renewable energy system, a third control circuit of the energy storage system, and a fourth control circuit of the power inverter.

30. A power system, comprising:
a DC power bus;
a photovoltaic system connected to the DC power bus;
an energy storage system connected to the DC power bus and configured to store energy injected to the DC power bus by the photovoltaic system;
a power inverter connected to the DC power bus, the power inverter configured to convert a DC power from the DC power bus to an AC power for an AC connected load;
a control system configured to:
receive power system data from one or more of the photovoltaic system, the energy storage system, or other device connected to the DC power bus; and
control, in real-time, one or more of the power inverter and the energy storage system based on the received power system data, wherein the energy storage system comprises a first control circuit and a first bi-directional converter and the photovoltaic system comprises a second control circuit and a second converter, and wherein the first bi-directional converter and the second converter have a common voltage for the DC power bus; and
one or more sensors connected to the DC power bus and the AC connected load, wherein the control circuits of the energy storage system and the photovoltaic system are configured to receive input signals from the one or sensors connected to the DC power bus and command signals from the control system, analyze the received input and/or command signals, and control an operating mode of the photovoltaic system and the energy storage system, respectively, based on the analysis.

31. The system according to claim 30, comprising:
a power converter configured to convert a power flowing between the photovoltaic system and the DC power bus.

32. The system according to claim 30, comprising:
a bi-directional power converter configured to convert power flowing between the energy storage system and the DC power bus.

33. The system according to claim 30, wherein if the photovoltaic system places more current on the DC power bus than is needed on the AC connected load, the control system is configured to control, in real-time, the energy storage system to act as a load on the DC power bus for storing excess current.

34. The system according to claim 30, wherein the input signals include voltage data and current data, and the command signals include control data.

35. The system according to claim 30, wherein the control system is configured to, in real-time, increase or decrease real power injected to the AC connected load in response to a change in frequency on the AC connected load by controlling the power inverter to act as a load on the DC power bus based on a change in frequency measured from the AC connected load via the one or more sensors,
wherein the control system is configured to analyze the frequency of the AC connected load relative to a setpoint and a dynamically generated response curve, and
wherein the response curve is generated by comparing predefined values of system parameters to measured values of the system parameters or is received from the server of the power provider.

36. The system according to claim 30, wherein the control system is configured to, in real-time, increase or decrease reactive power injected to the AC connected load in response to a change in voltage on the AC connected load by controlling the power inverter to act as a load on the DC power bus,
wherein the control system analyzes a measured voltage of the AC connected load relative to a setpoint and a dynamically generated response curve, and
wherein the response curve is generated by comparing predefined values of system parameters to measured values of the system parameters or is received from the server of the power provider.

37. The system according to claim 30, wherein the control system is configured to, in real-time, increase or decrease real power injected to the AC connected load based on a state of the energy storage system by controlling current setpoints of the power inverter and energy storage system based on one or more of measured parameters of the energy storage system, wherein the measured parameters include state of charge, operation status, voltage, current, or temperature.

38. The system according to claim 30, wherein the control system is configured to, in real-time, restrict the rate of increase or decrease in power injected to the AC connected load to a specified percent per second (%/s) by controlling current setpoints of the power inverter and the energy storage system based on a value of a predefined current setpoint or a current setpoint value received from the server of the power provider.

39. The system according to claim 30, wherein the control system is configured to balance a state of charge of the energy storage system by controlling a current setpoint of the energy storage system based on the value of the power inverter current setpoint, measured parameters of the energy storage system including a state of charge, and an amount of current measured on the DC power bus, wherein the energy storage system includes one or more energy storage systems in an energy storage facility.

40. The system according to claim 30, wherein the control system is configured to control the power inverter to remain connected to the AC connected load during one or more fault events on the AC connected load by controlling an operation of the power inverter and the energy storage system to provide auxiliary power to one or more sub-systems or components during the one or more fault events, wherein the control system initiates normal system operation upon normal operating conditions being measured by the one or more sensors.

41. The system according to claim 30, wherein the control system is configured to control the power inverter to act as a load during an outage of the AC connected load, and inject voltage, current, and reactive power to the AC connected load during restart from the outage in response to a command signal,
wherein the command signal is a manual or automatically generated signal and is encoded with data instructions for initiating operation without an external voltage reference until normal operation of the AC connected load has resumed.

42. The system according to claim 30, wherein the control system is configured to receive the power system data and to control, in real-time, one of the power inverter and the energy storage system based on the received power system data,
wherein the control system is configured to, in real-time, increase or decrease real power injected to the AC connected load in response to a change in frequency on the AC connected load,
wherein the control system is configured to, in real-time, increase or decrease reactive power injected to the AC connected load in response to a change in voltage on the AC connected load,
wherein the control system is configured to, in real-time, increase or decrease real power injected to the AC connected load based on a state of the energy storage system by controlling current setpoints of the power inverter and energy storage system,
wherein the control system is configured to, in real-time, restrict a rate of increase or decrease in power injected to the AC connected load to a specified percent per second (%/s),
wherein the control system is configured to balance a state of charge of one or more energy storage systems in an energy storage facility, and
wherein the control system is configured to control the power inverter to remain connected to the AC connected load during one or more fault events on the AC connected load.

43. The system according to claim 42, further comprising:
one or more sensors configured to measure parameters of the one or more sub-systems and devices, parameters of the DC power bus, and parameters of the AC connected load.

44. The system according to claim 30, wherein the control system is configured to, in real-time, increase or decrease real power injected to the AC connected load in response to a change in frequency on the AC connected load, and
wherein the control system is configured to, in real-time, restrict a rate of increase or decrease in power injected to the AC connected load to a specified percent per second (%/s).

45. A power system, comprising:
a DC power bus;
a photovoltaic system connected to the DC power bus;
an energy storage system connected to the DC power bus and configured to store energy injected to the DC power bus by the photovoltaic system;

a power inverter connected to the DC power bus, the power inverter configured to convert a DC power from the DC power bus to an AC power for an AC connected load; and a control system configured to:
  receive power system data from one or more of the photovoltaic system, the energy storage system, or other device connected to the DC power bus; and
  control, in real-time, one or more of the power inverter and the energy storage system based on the received power system data,
  wherein the control system is configured to, in real-time, increase or decrease real power injected to the AC connected load in response to a change in frequency on the AC connected load, and
  wherein the control system is configured to, in real-time, restrict a rate of increase or decrease in power injected to the AC connected load to a specified percent per second (%/s).

46. The system according to claim 45, wherein the control system is configured to receive the power system data and to control, in real-time, one of the power inverter and the energy storage system based on the received power system data,
  wherein the control system is configured to, in real-time, increase or decrease reactive power injected to the AC connected load in response to a change in voltage on the AC connected load,
  wherein the control system is configured to, in real-time, increase or decrease real power injected to the AC connected load based on a state of the energy storage system by controlling current setpoints of the power inverter and energy storage system,
  wherein the control system is configured to balance a state of charge of one or more energy storage systems in an energy storage facility, and
  wherein the control system is configured to control the power inverter to remain connected to the AC connected load during one or more fault events on the AC connected load.

* * * * *